United States Patent [19]

Flynn et al.

[11] Patent Number: 5,827,812
[45] Date of Patent: Oct. 27, 1998

[54] AZEOTROPE-LIKE COMPOSITIONS AND THEIR USE

[75] Inventors: Richard M. Flynn, Mahtomedi; Dean S. Milbrath, Stillwater; John G. Owens, Woodbury; Daniel R. Vitcak, Cottage Grove, all of Minn.; Hideto Yanome, Kanagawa, Japan

[73] Assignee: Minnesota Mining and Manufacturing Company, St. Paul, Minn.

[21] Appl. No.: 648,264

[22] Filed: May 15, 1996

Related U.S. Application Data

[63] Continuation-in-part of Ser. No. 604,002, Feb. 20, 1996, abandoned, which is a continuation-in-part of Ser. No. 441,960, May 16, 1995, abandoned.

[51] Int. Cl.[6] .............................. C11D 7/26; C11D 7/30; C11D 7/50
[52] U.S. Cl. .................. 510/411; 106/311; 134/42; 252/67; 252/364; 510/285
[58] Field of Search .................... 510/411, 285; 252/67, 364; 134/42; 106/311

[56] References Cited

U.S. PATENT DOCUMENTS

| | | |
|---|---|---|
| 2,713,593 | 7/1955 | Brice et al. |
| 3,394,878 | 7/1968 | Eiseman ..................... 252/67 |
| 3,900,372 | 8/1975 | Childs et al. ................ 204/81 |
| 3,903,012 | 9/1975 | Brandreth ................... 252/194 |
| 5,023,009 | 6/1991 | Merchant .................... 252/171 |
| 5,023,010 | 6/1991 | Merchant .................... 252/171 |
| 5,034,424 | 7/1991 | Wenning et al. ............. 521/109.1 |

(List continued on next page.)

FOREIGN PATENT DOCUMENTS

| | | |
|---|---|---|
| 0 450 855 A2 | 10/1991 | European Pat. Off. |
| 2287432 | 5/1976 | France. |
| 1294949 | 5/1969 | Germany. |
| 6-293686 | 10/1994 | Japan. |
| 8-259995 | 10/1995 | Japan. |
| 2 274 462 | 7/1994 | United Kingdom. |

OTHER PUBLICATIONS

P.S. Zurer, "Looming Ban on Production of CFCs, Halons Spurs Switch to Substitutes," *Chemical & Engineering News*, p. 12, Nov. 15, 1993.

Y. Tang, *Atmospheric Fate of Various Fluorocarbons*, M.S. Thesis, Massachusetts Institute of Technology (1993). No month available.

(List continued on next page.)

*Primary Examiner*—Christine Skane
*Attorney, Agent, or Firm*—Eloise J. Maki

[57] ABSTRACT

The invention provides azeotrope-like compositions consisting essentially of $R_fOCH_3$, where $R_f$ is a branched or straight chain perfluoroalkyl group having 4 carbon atoms, and one or more organic solvent(s) selected from the group consisting of: straight chain, branched chain and cyclic alkanes containing 6 to 8 carbon atoms; cyclic and acyclic ethers containing 4 to 6 carbon atoms; ketones having 3 carbon atoms; chlorinated alkanes containing 1, 3 or 4 carbon atoms; chlorinated alkenes containing 2 carbon atoms, alcohols containing 1 to 4 carbon atoms, partially fluorinated alcohols containing 2 to 3 carbon atoms, 1-bromopropane, acetonitrile, HCFC 225ca (1,1,-dichloro-2,2,3,3,3 pentafluoropropane and HCFC- 225cb (1,3-dichloro-1,1,2,2,3-pentafluoropropane).

21 Claims, 1 Drawing Sheet

U.S. PATENT DOCUMENTS

| | | | |
|---|---|---|---|
| 5,064,560 | 11/1991 | Merchant | 252/171 |
| 5,091,104 | 2/1992 | Van Der Puy | 252/171 |
| 5,098,595 | 3/1992 | Merchant | 252/171 |
| 5,125,978 | 6/1992 | Flynn et al. | 134/2 |
| 5,137,932 | 8/1992 | Behme et al. | 521/131 |
| 5,211,873 | 5/1993 | Dams et al. | 521/131 |
| 5,264,462 | 11/1993 | Hodson et al. | 521/88 |
| 5,273,592 | 12/1993 | Chi Li | 134/40 |
| 5,275,669 | 1/1994 | Van Der Puy et al. | 134/42 |
| 5,466,877 | 11/1995 | Moore | 562/852 |
| 5,484,546 | 1/1996 | Minor et al. | 252/67 |

OTHER PUBLICATIONS

H. Kobler et al., *Justus Liebigs Ann. Chem.,* 1978, pp. 1937–1945.

Cooper et al., *Atmos. Environ.* 26A, 7, 1331 (1992). No month available.

Intergovernmental Panel, *Climate Change: The IPCC Scientific Assessment,* Cambridge University Press (1990). No month available.

B. N. Ellis, *Cleaning and Contamination of Electronics Components and Assemblies,* Electrochemical Publications Limited, Ayr, Scotland, pp. 182–194 (1986). No month available.

M. C. Sneed and R. C. Brasted, *Comprehensive Inorganic Chemistry,* vol. Six (The Alkali Metals), pp. 61–64, D. Van Nostrand Company, Inc., New York (1957). No month available.

1995 American Chemical Society. Predictions of Azeotropes Formed From Fluorinated Ethers, Ethanes, and Propanes. Authors: Gage, C.L.; Kazachki, G.S. Report date: 1992. No. Month Available.

Preparations, Properties and Industrial Applications of Organofluorine Compounds, R.E. Banks, ed., John Wiley and sons, New York, 1982, pp. 19 to 43. No month availble. No. month Available.

5,827,812

AZEOTROPE-LIKE COMPOSITIONS AND THEIR USE

CROSS-REFERENCE TO RELATED APPLICATIONS

This application is a continuation-in-part of United States Patent Application No. 08/604,002, filed on Feb. 20, 1996 now abandoned which is a continuation-in-part of U.S. patent application Ser. No. 08/441,960, filed on May 16, 1995.

FIELD OF THE INVENTION

The invention relates to azeotropes and methods of using azeotropes to clean substrates, deposit coatings and transfer thermal energy.

BACKGROUND

Chlorofluorocarbons (CFCs) and hydrochlorofluorocarbons (HCFCs) have been used in a wide variety of solvent applications such as drying, cleaning (e.g., the removal of flux residues from printed circuit boards), and vapor degreasing. Such materials have also been used in refrigeration and heat transfer processes. While these materials were initially believed to be environmentally-benign, they have now been linked to ozone depletion. According to the Montreal Protocol and its attendant amendments, production and use of CFCs must be discontinued (see, e.g., P. S. Zurer, "Looming Ban on Production of CFCs, Halons Spurs Switch to Substitutes," *Chemical & Engineering News*, page 12, Nov. 15, 1993). The characteristics sought in replacements, in addition to low ozone depletion potential, typically have included boiling point ranges suitable for a variety of solvent cleaning applications, low flammability, and low toxicity. Solvent replacements also should have the ability to dissolve both hydrocarbon-based and fluorocarbon-based soils. Preferably, substitutes will also be low in toxicity, have no flash points (as measured by ASTM D3278-89), have acceptable stability for use in cleaning applications, and have short atmospheric lifetimes and low global warming potentials.

Certain perfluorinated (PFCs) and highly fluorinated hydrofluorocarbon (HFCs) materials have also been evaluated as CFC and HCFC replacements in solvent applications. While these compounds are generally sufficiently chemically stable, nontoxic and nonflammable to be used in solvent applications, PFCs tend to persist in the atmosphere, and PFCs and HFCs are generally less effective than CFCs and HCFCs for dissolving or dispersing hydrocarbon materials. Also, mixtures of PFCs or HFCs with hydrocarbons tend to be better solvents and dispersants for hydrocarbons than PFCs or HFCs alone.

Many azeotropes possess properties that make them useful solvents. For example, azeotropes have a constant boiling point, which avoids boiling temperature drift during processing and use. In addition, when a volume of an azeotrope is used as a solvent, the properties of the solvent remain constant because the composition of the solvent does not change. Azeotropes that are used as solvents also can be recovered conveniently by distillation.

There currently is a need for azeotrope or azeotrope-like compositions that can replace CFC- and HCFC-containing solvents. Preferably these compositions would be nonflammable, have good solvent power, cause no damage to the ozone layer and have a relatively short atmospheric lifetime so that they do not significantly contribute to global warming.

SUMMARY OF THE INVENTION

In one aspect, the invention provides azeotrope-like compositions consisting essentially of hydrofluorocarbon ether and one or more organic solvents. The hydrofluorocarbon ether is represented by the general formula $R_fCH_3$, where $R_f$ is a branched or straight chain perfluoroalkyl group having 4 carbon atoms, and the ether may be a single compound or a mixture of the branched and straight chain ether compounds. The organic solvents are selected from the group consisting of: straight chain, branched chain and cyclic alkanes containing 6 to 8 carbon atoms; cyclic and acyclic ethers containing 4 to 6 carbon atoms; ketones having 3 carbon atoms; chlorinated alkanes containing 1, 3 or 4 carbon atoms; chlorinated alkenes containing 2 to 3 carbon atoms, alcohols containing 1 to 4 carbon atoms, partially fluorinated alcohols containing 2 to 3 carbon atoms, 1-bromopropane, acetonitrile, HCFC-225ca (1,1,-dichloro-2,2,3,3,3 pentafluoropropane) and HCFC -225 cb (1,3 -dichloro- 1,1,2,2,3-pentafluoropropane). While the concentrations of the hydrofluorocarbon ether and organic solvent included in an azeotrope-like composition may vary somewhat from the concentrations found in the azeotrope formed between them and remain a composition within the scope of this invention, the boiling points of the azeotrope-like compositions will be substantially the same as those of their corresponding azeotropes. Preferably, the azeotrope-like compositions boil, at ambient pressure, at temperatures that are within about 1° C. of the temperatures at which their corresponding azeotropes boil at the same pressure.

In another aspect, the invention provides a method of cleaning objects by contacting the object to be cleaned with one or more of the azeotrope-like compositions of this invention or the vapor of such compositions until undesirable contaminants or soils on the object are dissolved, dispersed or displaced and rinsed away.

In yet another aspect, the invention also provides a method of coating substrates using the azeotrope-like compositions as solvents or carriers for the coating material. The process comprises the step of applying to at least a portion of at least one surface of a substrate a liquid coating composition comprising: (a) an azeotrope-like composition, and (b) at least one coating material which is soluble or dispersible in the azeotrope-like composition. Preferably, the process further comprises the step of removing the azeotrope-like composition from the liquid coating composition, for example, by evaporation.

The invention also provides coating compositions consisting essentially of an azeotrope-like composition and a coating material which are useful in the aforementioned coating process.

In yet another aspect, the invention provides a method of transferring thermal energy using the azeotrope-like compositions of this invention as heat transfer fluids (e.g. primary or secondary heat transfer media).

BRIEF DESCRIPTION OF THE DRAWINGS

The present invention will be further explained with reference to the appended Figure, wherein.

DETAILED DESCRIPTION

Figure 1:
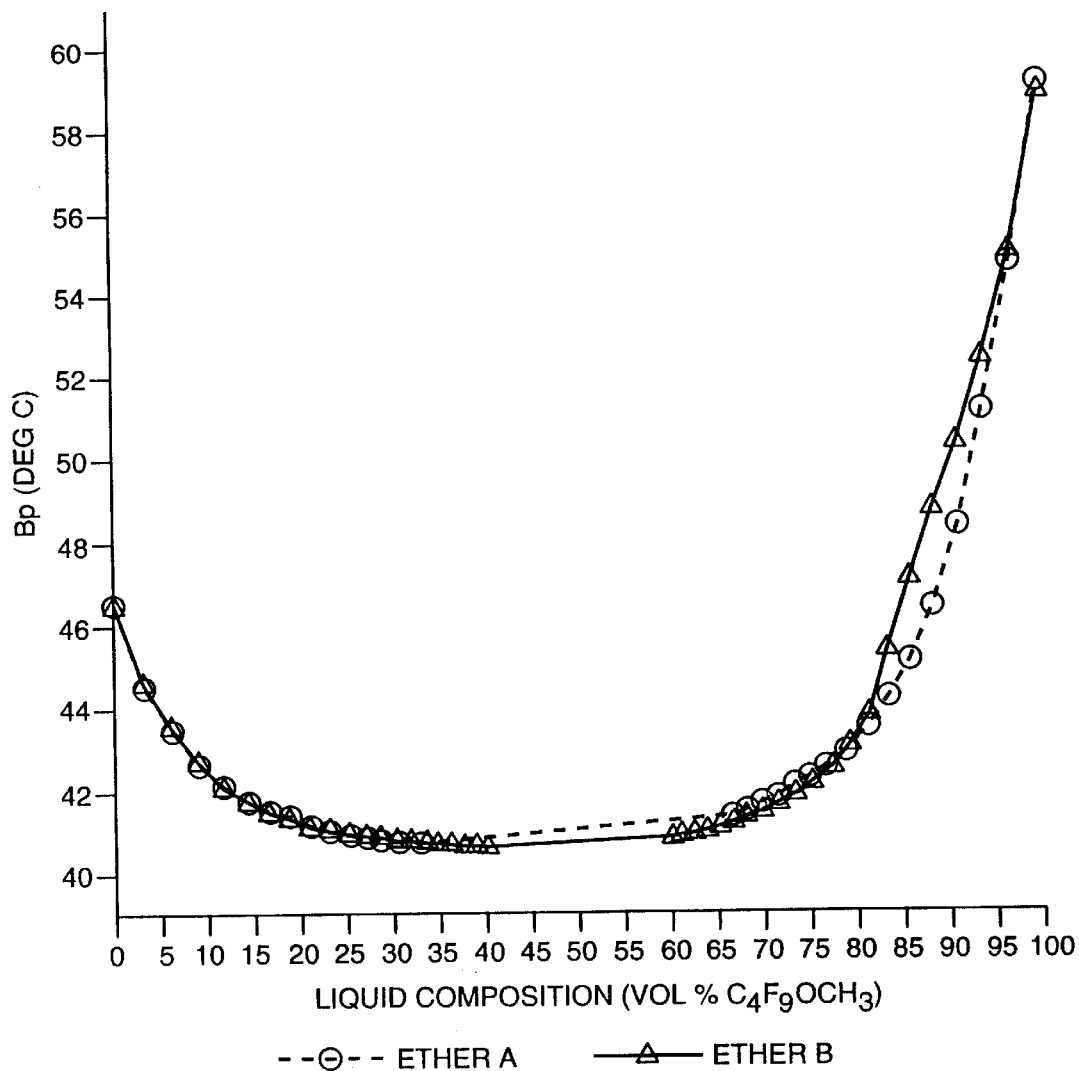
FIG. 1 is a graph of the boiling point versus the volume concentration of $C_4F_9OCH_3$ for two compositions containing trans-1,2-dichloroethylene and hydrofluorocarbon ethers having different concentrations of perfluoro-n-butyl methyl ether.

The azeotrope-like compositions are mixtures of hydrofluorocarbon ether and one or more organic solvents which, if fractionally distilled, produce a distillate fraction that is an azeotrope of the hydrofluorocarbon ether and organic solvent(s).

The azeotrope-like compositions boil at temperatures that are essentially the same as the boiling points of their corresponding azeotropes. Preferably, the boiling point of an azeotrope-like composition at ambient pressure is within about 1° C. of the boiling point of its corresponding azeotrope measured at the same pressure. More preferably, the azeotrope-like compositions will boil at temperatures that are within about 0.5° C. of the boiling points of their corresponding azeotropes measured at the same pressure.

The concentrations of the hydrofluorocarbon ether and organic solvent or organic solvents in a particular azeotrope-like composition may vary substantially from the amounts contained in the composition's corresponding azeotrope, and the magnitude of such permissible variation depends upon the organic solvent or solvents used to make the azeotrope-like composition. Preferably, the concentrations of hydrofluorocarbon ether and organic solvent in an azeotrope-like composition vary no more than about ten percent from the concentrations of such components contained in the azeotrope formed between them at ambient pressure. More preferably, the concentrations are within about five percent of those contained in the azeotrope. Most preferably, the azeotrope-like composition contains essentially the same concentrations of the ether and solvent as are contained in the azeotrope formed between them at ambient pressure. Where the concentrations of ether and organic solvent in an azeotrope-like composition differ from the concentrations contained in the corresponding azeotrope, the preferred compositions contain a concentration of the ether that is in excess of the ether's concentration in the azeotrope. Such compositions are likely to be less flammable than azeotrope-like compositions in which the organic solvent is present in a concentration that is in excess of its concentration in the azeotrope. The most preferred azeotrope-like compositions will exhibit no significant change in the solvent power of the compositions over time.

The azeotrope-like compositions of this invention may also contain, in addition to the hydrofluorocarbon ether and organic solvent, small amounts of other compounds which do not interfere in the formation of the azeotrope. For example, small amounts of surfactants may be present in the azeotrope-like compositions of the invention to improve the dispersibility or solubility of materials, such as water, soils or coating materials (e.g., perfluoropolyether lubricants and fluoropolymers), in the azeotrope-like composition. Azeotropes or azeotrope-like compositions containing as a component 1,2-trans-dichloroethylene preferably also contain about 0.25 to 1 weight percent of nitromethane and about 0.05 to 0.4 weight percent of epoxy butane to prevent degradation of the 1,2-trans-dichloroethylene. Most preferably, such compositions will contain about 0.5 weight percent nitromethane and 0.1 weight percent of the epoxy butane.

The characteristics of azeotropes are discussed in detail in Merchant, U.S. Pat. No. 5,064,560 (see, in particular, col. 4, lines 7–48).

The hydrofluorocarbon ether useful in the invention can be represented by the following general formula:

  (I)

where, in the above formula, $R_f$ is selected from the group consisting of linear or branched perfluoroalkyl groups having 4 carbon atoms. The ether may be a mixture of ethers having linear or branched perfluoroalkyl $R_f$ groups. For example, perfluorobutyl methyl ether containing about 95 weight percent perfluoro-n-butyl methyl ether and 5 weight percent perfluoroisobutyl methyl ether and perfluorobutyl methyl ether containing about 60 to 80 weight percent perfluoroisobutyl methyl ether and 40 to 20 weight percent perfluoro-n-butyl methyl ether are useful in this invention.

The hydrofluorocarbon ether can be prepared by alkylation of:

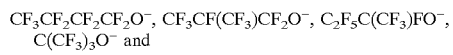

mixtures thereof The first three aforementioned perfluoroalkoxides can be prepared by reaction of: $CF_3CF_2CF_2C(O)F$, $CF_3CF(CF_3)C(O)F$, and $C_2F_5C(O)CF_3$ and mixtures thereof, with any suitable source of anhydrous fluoride ion such as anhydrous alkali metal fluoride (e.g., potassium fluoride or cesium fluoride) or anhydrous silver fluoride in an anhydrous polar, aprotic solvent in the presence of a quaternary ammonium compound such as "ADOGEN 464" available from the Aldrich Chemical Company. The perfluoroalkoxide, $C(CF_3)_3O^-$, can be prepared by reacting $C(CF_3)_3OH$ with a base such as KOH in an anhydrous polar, aprotic solvent in the presence of a quaternary ammonium compound. General preparative methods for the ethers are also described in French Patent No. 2,287,432 and German Patent No. 1,294,949.

Suitable alkylating agents for use in the preparation include dialkyl sulfates (e.g., dimethyl sulfate), alkyl halides (e.g., methyl iodide), alkyl p-toluenesulfonates (e.g., methyl p-toluenesulfonate), alkyl perfluoroalkanesulfonates (e.g., methyl perfluoromethanesulfonate), and the like. Suitable polar, aprotic solvents include acyclic ethers such as diethyl ether, ethylene glycol dimethyl ether, and diethylene glycol dimethyl ether; carboxylic acid esters such as methyl formate, ethyl formate, methyl acetate, diethyl carbonate, propylene carbonate, and ethylene carbonate; alkyl nitriles such as acetonitrile; alkyl amides such as N,N-dimethylformamide, N,N-diethylformamide, and N-methylpyrrolidone; alkyl sulfoxides such as dimethyl sulfoxide; alkyl sulfones such as dimethylsulfone, tetramethylene sulfone, and other sulfolanes; oxazolidones such as N-methyl-2-oxazolidone; and mixtures thereof Perfluorinated acyl fluorides (for use in preparing the hydrofluorocarbon ether) can be prepared by electrochemical fluorination (ECF) of the corresponding hydrocarbon carboxylic acid (or a derivative thereof), using either anhydrous hydrogen fluoride (Simons ECF) or KF.2HF (Phillips ECF) as the electrolyte. Perfluorinated acyl fluorides and perfluorinated ketones can also be prepared by dissociation of perfluorinated carboxylic acid esters (which can be prepared from the corresponding hydrocarbon or partially-fluorinated carboxylic acid esters by direct fluorination with fluorine gas). Dissociation can be achieved by contacting the perfluorinated ester with a source of fluoride ion under reacting conditions (see the methods described in U.S. Pat. No. 3,900,372 (Childs) and U.S. Pat. No. 5,466,877 (Moore), the description of which is incorporated herein by reference) or by combining the ester with at least one initiating reagent selected from the group consisting of gaseous, non-hydroxylic nucleophiles; liquid, non-hydroxylic nucleophiles; and mixtures of at least one non-hydroxylic nucleophile (gaseous, liquid, or solid) and at least one solvent which is inert to acylating agents.

Initiating reagents which can be employed in the dissociation are those gaseous or liquid, non-hydroxylic nucleophiles and mixtures of gaseous, liquid, or solid, non-hydroxylic nucleophile(s) and solvent (hereinafter termed "solvent mixtures") which are capable of nucleophilic reaction with perfluorinated esters. The presence of small amounts of hydroxylic nucleophiles can be tolerated. Suitable gaseous or liquid, non-hydroxylic nucleophiles include dialkylamines, trialkylamines, carboxamides, alkyl sulfoxides, amine oxides, oxazolidones, pyridines, and the like, and mixtures thereof Suitable non-hydroxylic nucleophiles for use in solvent mixtures include such gaseous or liquid, non-hydroxylic nucleophiles, as well as solid, non-hydroxylic nucleophiles, e.g., fluoride, cyanide, cyanate, iodide, chloride, bromide, acetate, mercaptide, alkoxide, thiocyanate, azide, trimethylsilyl difluoride, bisulfite, and bifluoride anions, which can be utilized in the form of alkali metal, ammonium, alkyl-substituted ammonium (mono-, di-, tri-, or tetra-substituted), or quaternary phosphonium salts, and mixtures thereof Such salts are in general commercially available but, if desired, can be prepared by known methods, e.g., those described by M. C. Sneed and R. C. Brasted in *Comprehensive Inorganic Chemistry,* Volume Six (The Alkali Metals), pages 61–64, D. Van Nostrand Company, Inc., New York (1957), and by H. Kobler et al. in *Justus Liebigs Ann. Chem.,* 1978, 1937. 1,4-diazabicyclo [2.2.2]octane and the like are also suitable solid nucleophiles.

The hydrofluorocarbon ethers used to prepare the azeotrope-like compositions of this invention do not deplete the ozone in the earth's atmosphere and have surprisingly short atmospheric lifetimes thereby minimizing their impact on global warming. Reported in Table 1 is an atmospheric lifetime for the hydrofluorocarbon ether which was calculated using the technique described in Y. Tang, *Atmospheric Fate of Various Fluorocarbons,* M. S. Thesis, Massachusetts Institute of Technology (1993). The results of this calculation are presented under the heading "Atmospheric Lifetime (years)". The atmospheric lifetimes of the hydrofluorocarbon ether and its corresponding hydrofluorocarbon alkane were also calculated using a correlation developed between the highest occupied molecular orbital energy and the known atmospheric lifetimes of hydrofluorocarbons and hydrofluorocarbon ethers that is similar to a correlation described by Cooper et al. in *Atmos. Environ.* 26A, 7, 1331 (1992). These values are reported in Table 1 under the heading "Estimated Atmospheric Lifetime." The global warming potential of the hydrofluorocarbon ether was calculated using the equation described in the Intergovernmental Panel's *Climate Change: The IPCC Scientific Assessment,* Cambridge University Press (1994). The results of that calculation are presented in Table 1 under the heading "Global Warming Potential". It is apparent from the data in Table 1 that the hydrofluorocarbon ether has a relatively short estimated atmospheric lifetime and relatively small global warming potential. Surprisingly, the hydrofluorocarbon ether also has a significantly shorter estimated atmospheric lifetime than its corresponding hydrofluorocarbon alkane.

TABLE 1

| Compound | Estimated Atmospheric Lifetime (years) | Atmospheric Lifetime (years) | Global Warming Potential (100 year ITH) |
|---|---|---|---|
| $C_4F_9$—$CH_3$ | 7.0 | — | — |
| $C_4F_9$—O—$CH_3$ | 1.9 | 4.1 | 500 |

Typical organic solvents useful in this invention include straight chain, branched chain and cyclic alkanes containing 6 to 8 carbon atoms (e.g., cyclohexane, methylcyclohexane, hexane, heptane and isooctane); cyclic or acyclic ethers containing 4 to 6 carbon atoms (e.g., t-butyl methyl ether,, tetrahydrofuran and di-isopropyl ether); ketones containing 3 carbon atoms (e.g., acetone), chlorinated alkanes containing one, three or four carbon atoms (e.g., methylene chloride, 1,2-dichloropropane, 2,2-dichloropropane, t-butyl chloride, i-butyl chloride, 2-chlorobutane and 1-chlorobutane); chlorinated alkenes containing 2 to 3 carbon atoms (e.g., cis-1,2-dichloroethylene, 1,1,2-trichloroethylene, trans- 1,2-dichloroethylene and 2,3-dichloro-1-propene); alcohols containing 1 to 4 carbon atoms (e.g., methanol, ethanol, 1-propanol, 2-propanol, i-butanol, t-butanol, 2-butanol), fluorinated alcohols having 2 to 3 carbon atoms (e.g., trifluoroethanol, pentafluoropropanol and hexafluoro-2-propanol), 1-bromopropane, acetonitrile and a 55 wt %/45 wt % mixture of HCFC-225ca and HCFC-225cb (respectively).

One or more of the organic solvents can be mixed with perfluorobutyl methyl ether to prepare the azeotropes and azeotrope-like compositions. Various examples of such azeotropes and azeotrope-like compositions are described in the Examples.

When nonhalogenated alcohols having 1 to 3 carbon atoms (i.e., methanol, ethanol, 1-propanol and isopropanol) are combined with the ether to make an azeotrope or azeotrope-like composition, the isomer composition of the ether may have some effect on the composition of the azeotrope. However, even in such mixtures, the boiling point of the azeotropes formed between the components are essentially the same.

Preferably, the azeotrope-like compositions are homogeneous. That is, they form a single phase under ambient conditions, i.e., at room temperature and atmospheric pressure.

The azeotrope-like compositions are prepared by mixing the desired amounts of hydrofluorocarbon ether, organic solvent or solvents and any other minor components such as surfactants together using conventional mixing means.

The cleaning process of the invention can be carried out by contacting a contaminated substrate with one of the azeotrope-like compositions of this invention until the contaminants on the substrate are dissolved, dispersed or displaced in or by the azeotrope-like composition and then removing (for example by rinsing the substrate with fresh, uncontaminated azeotrope-like composition or by removing a substrate immersed in an azeotrope-like composition from the bath and permitting the contaminated azeotrope-like composition to flow off of the substrate) the azeotrope-like composition containing the dissolved, dispersed or displaced contaminant from the substrate. The azeotrope-like composition can be used in either the vapor or the liquid state (or both), and any of the known techniques for "contacting" a substrate can be utilized. For example, the liquid azeotrope-like composition can be sprayed or brushed onto the substrate, the vaporous azeotrope-like composition can be blown across the substrate, or the substrate can be immersed in either a vaporous or a liquid azeotrope-like composition. Elevated temperatures, ultrasonic energy, and/or agitation can be used to facilitate the cleaning. Various different solvent cleaning techniques are described by B. N. Ellis in *Cleaning and Contamination of Electronics Components and Assemblies,* Electrochemical Publications Limited, Ayr, Scotland, pages 182–94 (1986).

Both organic and inorganic substrates can be cleaned by the process of the invention. Representative examples of the substrates include metals; ceramics; glass; polymers such as:

polycarbonate, polystyrene and acrylonitrile-butadiene-styrene copolymer; natural fibers (and fabrics derived therefrom) such as: cotton, silk, linen, wool, ramie; fur; leather and suede; synthetic fibers (and fabrics derived therefrom) such as: polyester, rayon, acrylics, nylon, polyolefin, acetates, triacetates and blends thereof; fabrics comprising a blend of natural and synthetic fibers; and composites of the foregoing materials. The process is especially useful in the precision cleaning of electronic components (e.g., circuit boards), optical or magnetic media, and medical devices and medical articles such as syringes, surgical equipment, implantable devices and prostheses.

The cleaning process of the invention can be used to dissolve or remove most contaminants from the surface of a substrate. For example, materials such as light hydrocarbon contaminants; higher molecular weight hydrocarbon contaminants such as mineral oils, greases, cutting and stamping oils and waxes; fluorocarbon contaminants such as perfluoropolyethers, bromotrifluoroethylene oligomers (gyroscope fluids), and chlorotrifluoroethylene oligomers (hydraulic fluids, lubricants); silicone oils and greases; solder fluxes; particulates; and other contaminants encountered in precision, electronic, metal, and medical device cleaning can be removed. The process is particularly useful for the removal of hydrocarbon contaminants (especially, light hydrocarbon oils), fluorocarbon contaminants, particulates, and water (as described in the next paragraph).

To displace or remove water from substrate surfaces, the cleaning process of the invention can be carried out as described in U.S. Pat. No. 5,125,978 (Flynn et al.) by contacting the surface of an article with an azeotrope-like composition which preferably contains a non-ionic fluoroaliphatic surface active agent. The wet article is immersed in the liquid azeotrope-like composition and agitated therein, the displaced water is separated from the azeotrope-like composition, and the resulting water-free article is removed from the liquid azeotrope-like composition. Further description of the process and the articles which can be treated are found in said U.S. Pat. No. 5,125,978 and the process can also be carried out as described in U.S. Pat. No. 3,903,012 (Brandreth).

The azeotrope-like compositions can also be used in coating deposition applications, where the azeotrope-like composition functions as a carrier for a coating material to enable deposition of the material on the surface of a substrate. The invention thus also provides a coating composition comprising the azeotrope-like composition and a process for depositing a coating on a substrate surface using the azeotrope-like composition. The process comprises the step of applying to at least a portion of at least one surface of a substrate a coating of a liquid coating composition comprising (a) an azeotrope-like composition, and (b) at least one coating material which is soluble or dispersible in the azeotrope-like composition. The coating composition can further comprise one or more additives (e.g., surfactants, coloring agents, stabilizers, anti-oxidants, flame retardants, and the like). Preferably, the process further comprises the step of removing the azeotrope-like composition from the deposited coating by, e.g., allowing evaporation (which can be aided by the application of, e.g., heat or vacuum).

The coating materials which can be deposited by the process include pigments, lubricants, stabilizers, adhesives, anti-oxidants, dyes, polymers, pharmaceuticals, release agents, inorganic oxides, and the like, and combinations thereof Preferred materials include perfluoropolyether, hydrocarbon, and silicone lubricants; amorphous copolymers of tetrafluoroethylene; polytetrafluoroethylene; and combinations thereof Representative examples of materials suitable for use in the process include titanium dioxide, iron oxides, magnesium oxide, perfluoropolyethers, polysiloxanes, stearic acid, acrylic adhesives, polytetrafluoroethylene, amorphous copolymers of tetrafluoroethylene, and combinations thereof Any of the substrates described above (for cleaning applications) can be coated via the process of the invention. The process can be particularly useful for coating magnetic hard disks or electrical connectors with perfluoropolyether lubricants or medical devices with silicone lubricants.

To form a coating composition, the components of the composition (i.e., the azeotrope-like composition, the coating material(s), and any additive(s) utilized) can be combined by any conventional mixing technique used for dissolving, dispersing, or emulsifying coating materials, e.g., by mechanical agitation, ultrasonic agitation, manual agitation, and the like. The azeotrope-like composition and the coating material(s) can be combined in any ratio depending upon the desired thickness of the coating, but the coating material(s) preferably constitute from about 0.1 to about 10 weight percent of the coating composition for most coating applications.

The deposition process of the invention can be carried out by applying the coating composition to a substrate by any conventional technique. For example, the composition can be brushed or sprayed (e.g., as an aerosol) onto the substrate, or the substrate can be spin-coated. Preferably, the substrate is coated by immersion in the composition. Immersion can be carried out at any suitable temperature and can be maintained for any convenient length of time. If the substrate is a tubing, such as a catheter, and it is desired to ensure that the composition coats the lumen wall, it may be advantageous to draw the composition into the lumen by the application of reduced pressure.

After a coating is applied to a substrate, the azeotrope-like composition can be removed from the deposited coating by evaporation. If desired, the rate of evaporation can be accelerated by application of reduced pressure or mild heat. The coating can be of any convenient thickness, and, in practice, the thickness will be determined by such factors as the viscosity of the coating material, the temperature at which the coating is applied, and the rate of withdrawal (if immersion is utilized).

Objects and advantages of this invention are further illustrated by the following examples, but the particular materials and amounts thereof recited in these examples, as well as other conditions and details, should not be construed to unduly limit this invention. Unless otherwise stated all amounts are in grams and all percentages are weight percentages.

EXAMPLES

Examples 1–2

The preparation of the perfluorobutyl methyl ether used to make the azeotrope-like compositions described in later Examples is described below.

Preparation of Ether "A". "Ether A", used to prepare some of the azeotrope-like compositions of the following Examples, was prepared as follows.

Perfluoro-n-butyryl fluoride, a reactant used to make Ether A, was prepared by electrochemically fluorinating n-butyryl chloride (>99% pure) in a Simons ECF cell of the type described in U.S. Pat. No. 2,713,593 (Brice et al.) and in *Preparation, Properties and Industrial Applications of Organofluorine Compounds,* R. E. Banks, ed., John Wiley and sons, New York, 1982, pp. 19 to 43.

The gaseous products from the Simons cell were cooled to −62° C. (−80° F.) and the resulting phases separated. The upper HF phase was recycled back to the ECF cell and the lower product phase collected.

The product phase yielded a mixture of approximately greater than 73.5% perfluoro-n-butyryl fluoride, 3.5% perfluoro-isobutyryl fluoride and 23% perfluorinated, inert cyclic compounds. This product phase was used in subsequent alkylations without further purification.

Into a 20 gallon Hastalloy C reactor with a stirrer and a cooling system was charged 6 kg (103.1 mole) of spray-dried potassium fluoride. The reactor was sealed and the pressure inside the reactor was reduced to less than 100 torr. Anhydrous dimethyl formamide (25.1 kg) was then added to the reactor and the reactor was cooled to below 0° C. with constant agitation. The perfluorobutyryl fluoride product described above (25.1 kg, 67.3 mole) was added to the reactor contents. When the temperature of the reactor reached −20° C., dimethyl sulfate (12.0 kg, 95.1 mole) was added to the reactor over a period of approximately two hours. The resulting mixture was then held for 16 hours with continued agitation, was raised to 50° C. for an additional four hours to facilitate complete reaction, and was cooled to 20° C. Then, volatile material (primarily perfluorooxacyclopentane present in the starting perfluorofluorobutyryl fluoride) was vented from the reactor over a three-hour period. The reactor was then resealed, and water (6.0 kg) was added slowly to the reactor. After the exothermic reaction of the water with unreacted perfluorobutyryl fluoride subsided, the reactor was cooled to 25° C., and the reactor contents were stirred for 30 minutes. The reactor pressure was carefully vented, and the lower organic phase of the resulting product was removed to afford 22.6 kg of product The crude product was treated with 68% aqueous KOH at 60° C. overnight, water was added and the product azeotropically distilled. The resulting distillate was phase-separated and the product phase fractionally distilled through a 2 foot (61 cm) Oldershaw column. Analysis revealed the product to be approximately 95 wt % perfluoro-n-butyl methyl ether and 5 wt. % perfluoro-isobutyl methyl ether and the product boiled at 59° C. (at 734.3 torr). The product identity was confirmed by GCMS, $^1$H and $^{19}$F NMR and IR.

Preparation of Ether "B". Perfluoroisobutyryl fluoride, a reactant that was used to make Ether B, was prepared by fluorinating isobutyric anhydride (>99% pure), in a Simons ECF cell (as described above) to form a perfluorobutyryl fluoride product containing approximately 56 wt. % perfluoroisobutyryl fluoride, 24 wt. % perfluoro-n-butyryl fluoride and 20 wt. % percent perfluorinated, inert products.

Ether B was then prepared by charging into a 100 gallon hastelloy reactor: spray-dried potassium fluoride (48 pounds, 375 moles), anhydrous diglyme (307 pounds), Adogen™ 464 (3.4 pounds, 3.2 moles), triethylamine (12 pounds, 53.9 moles) and perfluorobutyryl fluoride product (190 pounds, 319 moles, supra). While stirring at 75° F., dimethyl sulfate (113 pounds, 407 moles) was pumped into the reactor. The reactor was held at 104° F. for approximately two hours then heated to 140° F. and allowed to react overnight.

The reactor was then charged to 20 wt % aqueous potassium hydroxide (123 pounds) to neutralize any unreacted dimethyl sulfate and stirred for 30 minutes at 70° F. at a solution pH greater than 13. Aqueous HF was added to the solution until the pH was 7 to 8, and the product perfluorobutyl methyl ether fraction was distilled from the reaction mixture. The distillate was washed with water to remove methanol, then fractionally distilled to further purify the desired product. The process provided a product that was approximately 65% perfluoro-isobutyl methyl ether and 35% perfluoro-n-butyl methyl ether and boiled at about 59° C. at 734.2 torr. The product identity was confirmed by GCMS, $^1$H and $^{19}$F NMR and IR.

Examples 3–48

Preparation and Identification of Azeotrope Compositions: Ebulliometer Method.

The azeotropes of this invention were initially identified by screening mixtures of hydrofluorocarbon ether and various organic solvents using an ebulliometer or boiling point apparatus (specifically a Model MBP-100 available from Cal-Glass for Research, Inc., Costa Mesa California). The lower boiling component of the test mixtures (typically an amount of 25 to 30 mLs) was added to the boiling point apparatus, heated and allowed to equilibrate to its boiling point (typically about 30 minutes). After equilibration, the boiling point was recorded, a 1.0 mL aliquot of the higher boiling component was added to the apparatus and the resulting mixture was allowed to equilibrate for about 30 minutes at which time the boiling point was recorded. The test continued basically as described above, with additions to the test mixture of 1.0 mL of the higher boiling point component every 30 minutes until 15 to 20 mLs of the higher boiling point component had been added. The presence of an azeotrope was noted when the test mixture exhibited a lower boiling point than the boiling point of the lowest boiling component of the test mixture. The compositions corresponding to the aforementioned boiling points were determined. The composition (volume %) of the organic solvent in the composition was then plotted as a function of boiling point. The azeotrope-like compositions boiling at temperatures within about 1° C. of the respective azeotrope boiling point were then identified from the plot and this compositional data (on a weight % basis) as well as the boiling point range corresponding to the compositions (expressed as the difference between the composition boiling point and the azeotrope boiling point) are presented in Table 2.

The organic solvents used to prepare the azeotrope-like compositions described in these Examples were purchased commercially from the Aldrich Chemical Company and the Fluka Chemical Company, except for HCFC-225 ca/cb which was purchased from Asahi Glass Company as AK-225 ( a mixture of 45 weight percent HCFC-225ca, i.e., $C_2F_5CHCl_2$, and 55 weight percent of HCFC-225cb, i.e., $CF_2ClCF_2CHClF$)

TABLE 2

| Ex. | Organic Solvent | Conc. Solvent (wt %) | Conc. Ether (wt %) | Boiling Point (°C.) | Pressure (torr) |
|---|---|---|---|---|---|
| 3 | Cyclohexane:Ether A | 4.9–38.8 | 95.1–61.2 | 55.0 | 735.2 |
| 4 | Cyclohexane:Ether B | 4.9–38.8 | 95.1–61.2 | — | — |
| 5 | Methylcyclohexane: Ether A | 1.0–16.6 | 99–83.4 | 58.6 | 728.6 |
| 6 | Methylcyclohexane: Ether B | 1.0–16.6 | 99.0–83.4 | — | — |
| 7 | Hexane:Ether A | 7.3–55.6 | 92.7–44.4 | 52.1 | 735.8 |
| 8 | Heptane:Ether A | 1.0–14.4 | 98.6–85.6 | 58.7 | 732.3 |
| 9 | Heptane:Ether B | 1.0–14.4 | 98.6–85.6 | — | — |
| 10 | Isooctane:Ether A | 0.9–11.5 | 99.1–88.5 | 58.9 | 738.5 |
| 11 | Isooctane:Ether B | 0.9–11.5 | 99.1–88.5 | — | — |
| 12 | Diisopropyl ether: | 3.0–34.4 | 97.0–65.6 | 57.0 | 736.5 |

TABLE 2-continued

| Ex. | Organic Solvent | Conc. Solvent (wt %) | Conc. Ether (wt %) | Boiling Point (°C.) | Pressure (torr) |
|---|---|---|---|---|---|
| 13 | Methyl t-butyl ether: Ether A | 21.0–78.3 | 79.0–21.7 | 51.2 | 723.2 |
| 14 | Tetrahydrofuran: Ether A | 7.5–58 | 92.5–42.0 | 55.3 | 725.4 |
| 15 | Acetone:Ether A | 13.6–66.5 | 86.4–33.5 | 50.3 | 728.5 |
| 16 | trans-1,2-Dichloro-ethylene:Ether A | 24.6–83.8 | 75.4–16.2 | 40.7 | 727.5 |
| 17 | trans-1,2-Dichloro-ethylene:Ether B | 24.6–82.6 | 75.4–17.4 | 40.3 | 729.3 |
| 18 | cis-1,2-Dichloro-ethylene:Ether B | 28.0*–70.8 | 72.0–29.2 | 52.2 | 741.0 |
| 19 | 1,1,2-Trichloro-ethylene:Ether B | 2.0–31.5 | 98.0–68.5 | 57.8 | 736.5 |
| 20 | 1-Chlorobutane: Ether A | 3.0–31.7 | 97.0–68.3 | 57.0 | 728.4 |
| 21 | 1-Chlorobutane: Ether B | 3.0–31.7 | 97.0–68.3 | — | — |
| 22 | 2-Chlorobutane: Ether B | 6.7–44.6 | 93.3–55.4 | 55.0 | 736.9 |
| 23 | i-Butyl chloride: Ether B | 6.1–38 | 93.9–62.0 | 54.6 | 730.3 |
| 24 | t-Butyl chloride: Ether A | 28.3–86.7 | 71.7–13.3 | 47.0 | 732.8 |
| 25 | t-Butyl chloride: Ether B | 28.3–86.7 | 71.7–13.3 | — | — |
| 26 | 1,2-Dichloro-propane:Ether A | 1.5–17.9 | 98.5–82.1 | 58.9 | 724.1 |
| 27 | 1,2-Dichloro-propane:Ether B | 1.5–17.9 | 98.5–82.1 | — | — |
| 28 | 2,2-Dichloro-propane:Ether A | 8.2–42.9 | 91.8–57.1 | 55.9 | 734.6 |
| 29 | 2,2-Dichloro-propane:Ether B | 8.2–42.9 | 91.8–57.1 | — | — |
| 30 | Methylene chloride: Ether B | 17.5–92.1 | 82.5–7.9 | 34.5 | 736.6 |
| 31 | Methanol:Ether A | 3.3–48.4 | 96.7–51.6 | — | — |
| 32 | Methanol:Ether B | 3.3–48.4 | 96.7–51.6 | 45.8 | 732.8 |
| 33 | Ethanol:Ether A | 2.7–30.0 | 97.3–70.0 | — | — |
| 34 | Ethanol:Ether B | 2.7–30.0 | 97.3–70.0 | 51.8 | 727.6 |
| 35 | 2-Propanol:Ether A | 1.6–39.0 | 98.4–61.0 | — | — |
| 36 | 2-Propanol:Ether B | 1.6–39.0 | 98.4–61.0 | 54.4 | 724.9 |
| 37 | 1-Propanol:Ether A | 1.9–34.0 | 98.1–66.0 | — | — |
| 38 | 1-Propanol:Ether B | 1.9–34.0 | 98.1–66.0 | 56.6 | 732.7 |
| 39 | 2-Butanol:Ether B | 1.1–24.8 | 98.9–75.2 | 58.3 | 742.3 |
| 40 | i-Butanol:Ether B | 1.1–27.7 | 98.9–72.3 | 58.1 | 729.5 |
| 41 | t-Butanol:Ether B | 1.6–22.1 | 98.4–77.9 | 56.4 | 739.4 |
| 42 | Trifluoroethanol: Ether B | 5.5–40.8 | 94.5–59.2 | 52.1 | 721.6 |
| 43 | Pentafluoro-propanol:Ether B | 5.0–42.1 | 95.0–57.9 | 56.8 | 731.5 |
| 43a | Hexafluoro-2-propanol:Ether B | 15.7–68.5 | 84.3–31.5 | 52.1 | 729.1 |
| 44 | 1-Bromopropane: Ether B | 11.0–50.4 | 89.0–49.6 | 53.3 | 728.9 |
| 45 | Acetonitrile:Ether A | 2.1–22.0 | 97.9–78.0 | — | — |
| 46 | Acetonitrile:Ether B | 2.1–22.0 | 97.9–78.0 | 55.7 | 730.7 |
| 47 | HCFC-225 ca/cb: Ether A | 60.8–90.3 | 39.2–9.7 | — | — |
| 48 | HCFC-225 ca/cb: Ether B | 60.8–90.3 | 39.2–9.7 | 53.1 | 738.3 |

*End point is an estimated value. Estimate assumes curve is symmetrical.

Examples 49 to 94

Preparation and Characterization of the Azeotrope-like Compositions by the Distillation Method. Mixtures of hydrofluorocarbon ether and one or more organic solvents which exhibited a boiling point depression in the Ebulliometer Method were evaluated again to more precisely determine the composition of the azeotrope. Mixtures of these hydrofluorocarbon and organic solvents were prepared and distilled in a concentric tube distillation column (Model 9333 from Ace Glass, Vineland N.J.). The distillation was allowed to equilibrate at total reflux for at least 60 minutes. In each distillation, six successive distillate samples, each approximately 5 percent by volume of the total liquid charge, were taken while operating the column at a liquid reflux ratio of 20 to 1. The compositions of the distillate samples were then analyzed using an HP-5890 Series II Plus Gas Chromatograph (Hewlett-Packard) with a 30m HP-5 capillary column (cross-linked 5% phenyl methyl silicone gum stationary phase), a 30 m Stabilwax DA™ column (Alltech Assoc.) or a 30 m Carbograph I™ (Alltech Assoc.) and a flame ionization detector. The boiling points of the distillate were measured using a thermocouple which was accurate to about 1° C. The compositional data, boiling points and ambient pressures at which the boiling points were measured are reported in Table 3.

In some cases, both Ether A and Ether B were used to prepare azeotropes with the same organic solvent. For each such case, the standard deviation and mean of the concentrations of the azeotrope components were calculated and analyzed using a t-test (95% confidence level) to determine whether the differences in the azeotrope compositions prepared with Ether A and Ether B were statistically significant, or should be considered to be from the same population. Where the t-test indicated that the compositions were from the same population, the mean and standard deviation were calculated for the entire population (i.e., data for Ether A and Ether B azeotropes) and the mean value is also reported.

The azeotropes were also tested for flammability by placing a small aliquot of the azeotrope in an open aluminum dish and holding a flame source in contact with the vapor of the azeotrope above the dish. Flame propagation across the vapor indicated that the azeotrope was flammable. The flammability data is presented in Table 3 under the heading "Flammability". The flash points of select compositions were determined using a method similar to that described in ASTM D3278-89 test method B. Instead of cooling specimens using the aluminum cooling block described in test method B, specimens were cooled using solid $CO_2$. The results of the evaluation are presented in Table 3 under the heading "Flash Point".

TABLE 3

| Example | Organic Solvent:Ether | Ether Conc. (wt %) | Organic Solvent Conc. (wt %) | Boiling Point (°C.) | Ambient Pressure (torr) | Flammability | Flash Point |
|---|---|---|---|---|---|---|---|
| 49 | Cyclohexane:Ether A | 88.0 | 12 ± 3.6 | 54 | 737.5 | Yes | — |
| 50 | Methylcyclohexane: | 95.9 | 4.1 ± 0.9 | 58 | 734.4 | No | None |

TABLE 3-continued

| Example | Organic Solvent:Ether | Ether Conc. (wt %) | Organic Solvent Conc. (wt %) | Boiling Point (°C.) | Ambient Pressure (torr) | Flammability | Flash Point |
|---|---|---|---|---|---|---|---|
| 51 | Methylcyclohexane:Ether A | 96.9 | 3.1 ± 0.3 | 59 | 737.5 | No | None |
| 52 | Hexane:Ether A | 78.9 | 21.1 ± 1.5 | 51 | 730.5 | Yes | — |
| 53 | Heptane:Ether A | 95.2 | 4.8 ± 0.9 | 57 | 724.8 | No | None |
| 54 | Heptane:Ether B | 94.4 | 5.6 ± 0.3 | 59 | 729.4 | Yes | — |
| 55 | Isooctane:Ether A | 96.1 | 3.9 ± 1.2 | 58 | 724.8 | No | None |
| 56 | Isooctane:Ether B | 96.3 | 3.7 ± 0.9 | 58 | 730.6 | No | None |
| 57 | Diisopropyl ether:Ether A | 78.3 | 21.7 ± 2.1 | 56 | 730.5 | Yes | — |
| 58 | Methyl t-butyl ether:Ether A | 63.2 | 36.8 ± 3.3 | 51 | 738.2 | Yes | — |
| 59 | Tetrahydrofuran:Ether A | 79.4 | 20.6 ± 1.8 | 55 | 738.2 | Yes | — |
| 60 | Acetone:Ether A | 65.0 | 35.0 ± 1.5 | 51 | 736.2 | Yes | — |
| 61 | trans-1,2-Dichloroethylene:Ether A | 44.1 | 55.9 ± 12.3 | 40 | 732.9 | No | None |
| 62 | trans-1,2-Dichloroethylene:Ether B | 50.3 | 49.7 ± 1.2 | 40 | 729.3 | No | None |
| 63 | cis-1,2-Dichloroethylene:Ether B | 65.7 | 34.3 ± 0.6 | 50 | 741.2 | No | None |

Examples 95–140

A number of the azeotropes were tested for their ability to dissolve hydrocarbons of increasing molecular weight according to the procedure described in U.S. Pat. No. 5,275,669 (Van Der Puy et al.) The data presented in Table 4 was obtained by determining the largest normal hydrocarbon alkane which was soluble in a particular azeotrope at a level of 50 volume percent. The hydrocarbon solubilities in the azeotropes were measured at both room temperature and the boiling points of the azeotropes. The data is reported in Table 4. The numbers in Table 4 under the headings "Hydrocarbon @RT" and "Hydrocarbon @BP" correspond to the number of carbon atoms in the largest hydrocarbon n-alkane that was soluble in each of the azeotropes at room temperature and at the boiling point of the azeotrope, respectively.

Azeotropes were prepared and their boiling points were measured using a resistance temperature detector. These measurements were accurate within about 0.2° C. and are presented in Table 4.

The data in Table 4 shows that hydrocarbon alkanes are very soluble in the azeotrope-like compositions of this invention, and so the azeotrope-like compositions are excellent solvents for the cleaning process of this invention. These compositions will also be effective as solvents for depositing hydrocarbon coatings, e.g., coatings of lubricant, onto substrate surfaces.

TABLE 4

| Ex. | Organic Solvent:Ether | Ether Conc. (wt %) | Organic Solvent Conc. (wt %) | Hydrocarbon @ RT (# carbon atoms) | Hydrocarbon @ BP (# carbon atoms) | Boiling Point Azeotrope (°C.) | Ambient Pressure (torr) |
|---|---|---|---|---|---|---|---|
| 95 | Cyclohexane:Ether A | 88.0 | 12.0 ± 3.6 | 10 | 13 | 54.6 | 725.6 |
| 96 | Methylcyclohexane:Ether A | 95.9 | 4.1 ± 0.9 | 9 | 12 | 58.7 | 728.8 |
| 97 | Methylcyclohexane:Ether B | 96.9 | 3.1 ± 0.3 | 9 | 12 | 58.5 | 743.1 |
| 98 | Hexane:Ether A | 78.9 | 21.1 ± 1.5 | 11 | 15 | 52.2 | 729.1 |
| 99 | Heptane:Ether A | 95.2 | 4.8 ± 0.9 | 10 | 12 | 58.8 | 733.2 |
| 100 | Heptane:Ether B | 94.4 | 5.6 ± 0.3 | 10 | 13 | 58.5 | 731.9 |
| 101 | Isooctane:Ether A | 96.1 | 3.9 ± 1.2 | 10 | 13 | 59.4 | 734.2 |
| 102 | Isooctane:Ether B | 96.3 | 3.7 ± 0.9 | 10 | 12 | 58.6 | 732.0 |
| 103 | Diisopropyl ether:Ether A | 78.3 | 21.7 ± 2.1 | 12 | 18 | 57.4 | 736.0 |
| 140 | Methyl t-butyl ether:Ether A | 63.2 | 36.8 ± 3.3 | 19 | >24 | 51.6 | 728.8 |
| 105 | Tetrahydrofuran:Ether A | 79.4 | 20.6 ± 1.8 | 14 | >17 | 55.6 | 729.4 |
| 106 | Acetone:Ether A | 65.0 | 35.0 ± 1.5 | 14 | 18 | 50.7 | 735.6 |
| 107 | trans-1,2-Dichloroethylene:Ether A | 44.1 | 55.9 ± 12.3 | 18 | 19 | 40.9 | 729.9 |
| 108 | trans-1,2-Dichloroethylene:Ether B | 50.3 | 49.7 ± 1.2 | 16 | 19 | 40.8 | 739.5 |
| 109 | cis-1,2-Dichloroethylene:Ether B | 65.7 | 34.3 ± 0.6 | 14 | 19 | 54.9 | 740.6 |
| 110 | 1,1,2-Trichloroethylene:Ether B | 86.8 | 13.2 ± 0.6 | 10 | 14 | 57.9 | 743.5 |
| 111 | 1-Chlorobutane:Ether A | 86.4 | 13.6 ± 1.5 | 11 | 14 | 57.1 | 730.1 |
| 112 | 1-Chlorobutane:Ether B | 87.8 | 12.2 ± 1.5 | 11 | 14 | 56.7 | 731.5 |
| 113 | 2-Chlorobutane:Ether B | 79.3 | 20.7 ± 0.3 | 12 | 16 | 55.1 | 740.3 |
| 114 | i-Butyl chloride:Ether B | 80.0 | 20.0 ± 0.1 | 12 | 15 | 54.9 | 740.7 |
| 115 | t-Butyl chloride:Ether A | 46.2 | 53.8 ± 0.6 | 20 | >24 | 47.2 | 722.6 |
| 116 | t-Butyl chloride:Ether B | 47.3 | 52.7 ± 0.6 | 20 | >24 | 47.6 | 743.2 |
| 117 | 1,2-Dichloropropane:Ether A | 95.0 | 5.0 ± 0.6 | 10 | 13 | 59.2 | 731.5 |

TABLE 4-continued

| Ex. | Organic Solvent:Ether | Ether Conc. (wt %) | Organic Solvent Conc. (wt %) | Hydrocarbon @ RT (# carbon atoms) | Hydrocarbon @ BP (# carbon atoms) | Boiling Point Azeotrope (°C.) | Ambient Pressure (torr) |
|---|---|---|---|---|---|---|---|
| 118 | 1,2-Dichloropropane:Ether B | 94.5 | 5.5 ± 0.3 | 10 | 13 | 58.9 | 744.7 |
| 119 | 2,2-Dichloropropane:Ether A | 77.2 | 22.8 | 12 | 16 | 55.9 | 723.0 |
| 120 | 2,2-Dichloropropane:Ether B | 81.2 | 18.8 ± 0.3 | 12 | 15 | 55.4 | 727.4 |
| 121 | Methylene chloride:Ether B | 44.9 | 55.1 ± 0.6 | 19 | 24 | 34.7 | 743.3 |
| 122 | Methanol:Ether A | 96.3 | 3.7 ± 0.9 | 10 | 11 | 46.5 | 734.9 |
| 123 | Methanol:Ether B | 89.6 | 10.4 ± 1.2 | 10 | 11 | 45.8 | 732.9 |
| 124 | Ethanol:Ether A | 97.0 | 3.0 ± 0.3 | 10 | 12 | 52.6 | 735.6 |
| 125 | Ethanol:Ether B | 93.4 | 6.6 ± 0.6 | 10 | 13 | 52.0 | 732.5 |
| 126 | 2-Propanol:Ether A | 96.8 | 3.2 ± 0.6 | 10 | 12 | 55.5 | 735.8 |
| 127 | 2-Propanol:Ether B | 93.0 | 7.0 ± 0.9 | 10 | 13 | 54.7 | 737.3 |
| 128 | 1-Propanol:Ether A | 98.4 | 1.6 ± 0.3 | 10 | 12 | 57.4 | 734.8 |
| 129 | 1-Propanol:Ether B | 97.4 | 2.6 ± 0.3 | 10 | 12 | 56.2 | 729.2 |
| 130 | 2-Butanol:Ether B | 98.0 | 2.0 ± 0.6 | 10 | 12 | 58.1 | 741.6 |
| 131 | i-Butanol:Ether B | 98.8 | 1.2 ± 0.3 | 9 | 12 | 58.3 | 742.5 |
| 132 | t-Butanol:Ether B | 93.8 | 6.2 ± 0.1 | 10 | 13 | 55.8 | 741.2 |
| 133 | Trifluoroethanol:Ether B | 85.6 | 14.4 ± 0.6 | 8 | 10 | 52.5 | 740.4 |
| 134 | Pentafluoropropanol:Ether B | 88.6 | 11.4 ± 0.3 | 8 | 11 | 56.6 | 740.2 |
| 135 | Hexafluoro-2-propanol:Ether B | 57.5 | 42.5 ± 0.6 | 7 | 9 | 52.5 | 747.6 |
| 136 | Acetonitrile:Ether A | 92.0 | 8.0 ± 0.3 | 9 | 12 | 54.4 | 728.8 |
| 137 | Acetonitrile:Ether B | 93.3 | 6.7 ± 0.1 | 9 | 13 | 55.7 | 740.5 |
| 138 | HCFC-225 ca/cb:Ether A | 26.4 | 73.6 | 19 | >24 | 53.1 | 723.3 |
| 139 | HCFC-225 ca/cb:Ether B | 30.6 | 69.4 ± 4.2 | 19 | >24 | 53.3 | 740.4 |
| 140 | 1-Bromopropane:Ether B | 74.2 | 25.8 ± 0.1 | 12 | 15 | 53.0 | 723.9 |

Examples 141–151

The following examples describe the preparation of azeotropes containing Ether B and two organic solvents.

Azeotrope composition was determined using the distillation method described in Examples 49–94, their boiling points were measured using the procedure described in Examples 95–140 and their cleaning power was determined using the procedure described in Examples 95–140. The data is presented in Table 5.

Azeotrope-like compositions containing within about 10 wt. % of each component contained in the azeotropes of Table 5 are useful azeotrope-like compositions in accordance with the invention and have many utilities such as cleaning solvents, coating composition solvents and drying agents.

TABLE 5

| Example | Component | Weight (%) | Boiling Point (°C.) | Pressure (torr) | Hydrocarbon @ RT (# carbon atoms) | Hydrocarbon @ BP (# carbon atoms) | Flammability |
|---|---|---|---|---|---|---|---|
| 141 | Ether B | 51.9 | 36.3 | 732.2 | 15 | 18 | Yes |
|  | 1,2-t-Dichloroethylene | 43.0 ± 2.4 |  |  |  |  |  |
|  | Methanol | 5.1 ± 2.4 |  |  |  |  |  |
| 142 | Ether B | 52.7 | 39.6 | 731.2 | 15 | 18 | No |
|  | 1,2-t-Dichloroethylene | 44.6 ± 2.4 |  |  |  |  |  |
|  | Ethanol | 2.7 ± 0.6 |  |  |  |  |  |
| 143 | Ether B | 51.1 | 40.5 | 732.9 | 15 | 18 | No |
|  | 1,2-t-Dichloroethylene | 48.6 ± 2.7 |  |  |  |  |  |
|  | 1-Propanol | 0.3 ± 0.9 |  |  |  |  |  |
| 144 | Ether B | 51.7 | 40.5 | 736.7 | 15 | 18 | No |
|  | 1,2-t-Dichloroethylene | 47.0 ± 2.4 |  |  |  |  |  |
|  | 2-Propanol | 1.3 ± 0.6 |  |  |  |  |  |
| 145 | Ether B | 53.5 | 40.3 | 729.5 | 15 | 19 | No |
|  | 1,2-t-Dichloroethylene | 45.9 ± 11.7 |  |  |  |  |  |
|  | t-Butanol | 0.6 ± 0.6 |  |  |  |  |  |
| 146 | Ether B | 43.8 | 38.9 | 734.1 | 9 | 12 | No |
|  | 1,2-t-Dichloroethylene | 46.8 ± 0.3 |  |  |  |  |  |
|  | Trifluoroethanol | 9.4 ± 0.3 |  |  |  |  |  |
| 147 | Ether B | 47.4 | 40.4 | 733.7 | 14 | 18 | No |
|  | 1,2-t-Dichloroethylene | 46.8 ± 1.5 |  |  |  |  |  |
|  | Pentafluoro-1-propanol | 5.8 ± 1.8 |  |  |  |  |  |
| 148 | Ether B | 36.3 | 39.2 | 735.2 | 11 | 15 | No |
|  | t-Dichloroethylene | 44.3 ± 0.3 |  |  |  |  |  |
|  | Hexafluoro-2-propanol | 19.4 ± 11.7 |  |  |  |  |  |
| 149 | Ether B | 51.6 | 40.3 | 728.2 | 15 | 19 | No |
|  | 1,2-t-Dichloroethylene | 48.1 |  |  |  |  |  |
|  | Acetonitrile | 0.3 |  |  |  |  |  |
| 150 | Ether B | 45.6 | 45.8 | 733.5 | 14 | 17 | No |
|  | HCFC-225 ca/cb | 48.6 ± 1.8 |  |  |  |  |  |

TABLE 5-continued

| Example | Component | Weight (%) | Boiling Point (°C.) | Pressure (torr) | Hydrocarbon @ RT (# carbon atoms) | Hydrocarbon @ BP (# carbon atoms) | Flammability |
|---|---|---|---|---|---|---|---|
| 151 | Methanol<br>Ether B<br>HCFC-225 ca/cb<br>Ethanol | 6.6 ± 0.3<br>42.5<br>53.2 ± 1.2<br>4.3 ± 0.1 | 51.0 | 735.0 | 16 | 21 | No |

Example 152

The following examples illustrate the use of one of the azeotropic compositions of this invention as a solvent or extraction media.

A mineral oil filled polypropylene microporous membrane prepared according to the procedure described in Example 10 of U.S. Pat. No. 4,726,989 was cut into 1.5×3.0 cm strips and weighed.

The oil-laden strips were subsequently immersed in either about 30 mLs of Ether B or about 30 mLs of an azeotrope-like composition consisting of 50 wt. % of Ether B and 50 wt. % of trans-1,2-dichloroethylene. The samples were lightly agitated in their respective solvent or extraction media for about one minute and then withdrawn and air-dried. The samples were then weighed to determine the amount of oil removed by Ether B and the azeotrope-like composition containing Ether B. Ether B removed 0.026+0.006 g oil per g of membrane while the azeotrope-like composition removed 0.379+0.015 g oil per g of membrane. This data demonstrates that some of the azeotrope like compositions of this invention are more effective solvents or extraction media than the Ether B alone.

Example 153

This example shows that an azeotrope like composition of the invention can be used in commercial dry cleaning processes.

Into four, 30 mL glass screw cap vials were added the following:

(1) about 40 g of Ether B and 10 drops (0.24 g) of SECAPUR DRY-MASTER™ dry cleaning detergent (a cationic detergent available commercially from Buesing & Fasch GmbH & Co-Reinigungs-u. Veredelungstechnik of Oldenburg, Germany);

(2) about 40 g of Ether B and 10 drops (0.24 g) of SECAPUR PERFECT™ dry cleaning detergent (an anionic detergent also available commercially from Buesing & Fasch GmbH);

(3) 40 g of mixture of 50 wt. % Ether B and 50 wt. % of trans-1,2-dichloroethylene, and about 10 drops (0.24 g) of SECAPUR DRY-MASTER™ detergent; and (4) 40 g of a mixture of 50 wt. % Ether B and 50 wt. % of trans-1,2-dichloroethylene, and about 10 drops (0.24 g) of SECAPUR PERFECT™ detergent.

The bottles were shaken by hand and visually evaluated to determine the solubility of the detergents in the ether or azeotrope-like composition. Ether B did not dissolve either detergent, while the azeotrope-like composition dissolved both detergents. The bottle containing the azeotrope-like composition and the SECAPUR DRY-MASTER™ detergent was somewhat hazy with 10 drops of the detergent, but it did not readily separate into separate phases. However, 5 drops (0.12 g) of SECAPUR DRY-MASTER™ detergent was fully soluble in the azeotrope-like composition.

Solutions of the detergent/azeotrope-like compositions described above were evaluated as dry cleaning agents for white cotton fabric swatches stained with dirty motor oil. Dirty motor oil was poured on 1.5×1.5 cm cotton fabric swatches and the swatches were then placed under a 500 g weight for 3 hrs to ensure good penetration of the oil into the fabric. The stained swatches were then placed in containers containing the detergent/azeotrope-like compositions described above, and the containers were capped and shaken for about 2 minutes. The swatches were then removed and air-dried before visually comparing them to unstained swatches. Both of the detergent-containing compositions were observed to have completely removed the oil stain from the swatches.

Examples 154–156

In the following examples, the compositions of azeotropes formed by trans-1,2-dichloroethylene and hydrofluorocarbon ether having various relative proportions of perfluoro-n-butyl methyl ether and perfluoroisobutyl methyl ether were determined.

25 mL mixtures of trans-1,2-dichloroethylene and hydrofluorocarbon ether having the relative proportions of perfluoro-n-butyl methyl ether and perfluoroisobutyl methyl ether specified in Table 6 were prepared. Each of the mixtures was distilled using an Ace Glass 9333 concentric tube distillation column having 40 theoretical plates (stated). In each distillation, the column was allowed to equilibrate for one hour at total reflux. The reflux ratio was subsequently adjusted to 20 to 1 and thereafter, six, 1 mL samples of distillate were removed from the receiver. Each of the samples was analyzed via gas chromatography using a Hewlett Packard 5890 GC containing an HP-5 capillary column from Hewlett Packard to determine the relative concentrations of trans-1,2-dichloroethylene and hydrofluorocarbon ether in the azeotropes. The relative proportions of perfluoro-n-butyl methyl ether and perfluoroisobutyl methyl ether in the hydrofluorocarbon ether and the concentration of trans-1,2-dichloroethylene and hydrofluorocarbon ether in the azeotropes is presented in Table 6.

| Example No. | Concentration of Perfluoro-n-Butyl Methyl Ether in Hydrofluorocarbon Ether (wt. %) | Concentration of Perfluoroisobutyl Methyl Ether in Hydrofluorocarbon Ether (wt. %) | Concentration of Trans-1,2-Dichloroethylene in Azeotrope (wt. %) | Concentration of Hydrofluorocarbon Ether in Azeotrope (wt. %) |
|---|---|---|---|---|
| 154 | 95 | 5 | 55.9 | 44.1 |
| 155 | 62.5 | 37.5 | 51.5 | 48.5 |
| 156 | 30 | 70 | 49.7 | 50.3 |

The data shows that despite the variation in the concentration of branched and straight chain isomers in the hydrofluorocarbon ether, the composition of the azeotrope formed with trans-1,2-dichloroethylene is largely unchanged.

Examples 157–158

The following examples illustrate that the effect of hydrofluoro isomer concentration on the boiling point curves for azeotropic compositions of hydrofluorocarbon ether and trans-1,2-dichloroethylene.

Using the method described in Examples 3–48, graphs of boiling point (° C.) as a function of composition (volume %) were prepared for mixtures of Ether A and trans-1,2-dichloroethylene and Ether B and trans-1,2-dichloroethylene. The curves are presented in FIG. 1.

The data shows that the curves are very similar despite the different concentrations of perfluoro-n-butyl methyl ether in Ether A and Ether B. The relatively constant boiling point compositions prepared with Ether A (represented by the flat portion of the boiling point curve) contain between about 16.2 and 75.4 weight percent Ether A while the relatively constant boiling point compositions prepared with Ether B contain about 17.4 to 75.4 weight percent Ether B. The boiling point of Ether A is 40.7° C. at 727.5 torr and the boiling point of Ether B is 40.3° C. at 729.3 torr.

Various modifications and alterations of this invention will be apparent to those skilled in the art without departing from the scope and spirit of this invention.

We claim:

1. An azeotrope-like composition including (a) perfluorobutyl methyl ether consisting essentially of perfluoro-n-butyl methyl ether and perfluoroisobutyl methyl ether, and (b) organic solvent, which composition is selected from the group consisting of:
   (i) compositions consisting essentially of about 75 to 17 weight percent of the ether and about 25 to 83 weight percent trans-1,2-dichloroethylene that boil at about 39° to 41° C. at about 729 torr;
   (ii) compositions consisting essentially of about 72 to 29 weight percent of the ether and about 28 to 71 weight percent cis-1,2-dichloroethylene that boil at about 51° to 53° C. at about 741 torr;
   (iii) compositions consisting essentially of about 98 to 68 weight percent of the ether and about 2 to 32 weight percent 1,1,2-trichloroethylene that boil at about 57° to 59° C. at about 736 torr;
   (iv) compositions consisting essentially of about 97 to 68 weight percent of the ether and about 3 to 32 weight percent 1-chlorobutane that boil at about 56° to 58° C. at about 728 torr;
   (v) compositions consisting essentially of about 93 to 55 weight percent of the ether and about 7 to 45 weight percent 2-chlorobutane that boil at about 54° to 56° C. at about 737 torr;
   (vi) compositions consisting essentially of about 94 to 62 weight percent of the ether and about 6 to 38 weight percent i-butyl chloride that boil at about 54° to 56° C. at about 730 torr;
   (vii) compositions consisting essentially of about 72 to 13 weight percent of the ether and about 28 to 87 weight percent t-butyl chloride that boil at about 46° to 48° C. at about 733 torr;
   (viii) compositions consisting essentially of about 98 to 82 weight percent of the ether and about 2 to 18 weight percent 1,2-dichloropropane that boil at about 58° to 60° C. at about 724 torr;
   (ix) compositions consisting essentially of about 92 to 57 weight percent of the ether and about 8 to 43 weight percent 2,2-dichloropropane that boil at about 55° to 57° C. at about 735 torr;
   (x) the composition consisting essentially of about 82 to 8 weight percent of the ether and about 18 to 92 weight percent methylene chloride that boil at about 33° to 35° C. at about 737 torr;
   (xi) compositions consisting essentially of about 89 to 50 weight percent of the ether and about 11 to 50 weight percent 1-bromopropane that boil at about 52° to 54° C. at about 729 torr; and
   (xii) compositions consisting essentially of about 39 to 10 weight percent of the ether and 61 to 90 weight percent of HCFC-225ca/cb that boil at about 52° to 54° C. at about 738 torr.

2. An azeotrope-like composition including (a) perfluorobutyl methyl ether consisting essentially of about 95 weight percent perfluoro-n-butyl methyl ether and about 5 weight percent perfluoroisobutyl methyl ether, and (b) organic solvent, which composition is selected from the group consisting of:
   (i) compositions consisting essentially of the ether and trans-1,2-dichloroethylene which when fractionally distilled, form a distillate fraction that is an azeotrope that consists essentially of about 44 weight percent of the ether and 56 percent of the trans-1,2-dichloroethylene and boils at about 41° C. at about 730 torr;
   (ii) compositions consisting essentially of the ether and 1-chlorobutane which, when fractionally distilled, form a distillate fraction that is an azeotrope that consists essentially of about 86 weight percent of the ether and 14 percent of the 1-chlorobutane and boils at about 57° C. at about 730 torr;
   (iii) compositions consisting essentially of the ether and 1,2-dichloropropane which, when fractionally distilled, form a distillate fraction that is an azeotrope that consists essentially of about 95 weight percent of the ether and 5 percent of the 1,2-dichloropropane and boils at about 59° C. at about 732 torr;
   (iv) compositions consisting essentially of the ether and 2,2-dichloropropane which, when fractionally distilled, form a distillate fraction that is an azeotrope that consists essentially of about 77 weight percent of the ether and 23 percent of the 2,2-dichloropropane and boils at about 56° C. at about 723 torr;
   (v) compositions consisting essentially of the ether and t-butyl chloride which, when fractionally distilled, form a distillate fraction that is an azeotrope that consists essentially of about 46 weight percent of the ether and about 54 percent of the t-butyl chloride and boils at about 47° C. at about 723 torr; and (vi) compositions consisting essentially of the ether and HCFC-225ca/cb which, when fractionally distilled, form a distillate fraction that is an azeotrope that consists essentially of about 26 weight percent of the ether and about 74 percent of the HCFC-225ca/cb and boils at about 53° C. at about 723 torr;

wherein the concentrations of the ether and the organic solvent in the azeotrope-like composition differ from the concentrations of such components in the corresponding azeotrope by no more than ten percent.

3. An azeotrope-like composition according to claim 2 wherein the concentrations of the ether and the organic solvent in the azeotrope-like composition differ from the concentrations of such components in the corresponding azeotrope by no more than five percent.

4. An azeotrope-like composition according to claim 2 wherein the azeotrope-like composition is an azeotrope.

5. An azeotrope-like composition including (a) perfluorobutyl methyl ether consisting essentially of about 35 weight percent perfluoro-n-butyl methyl ether and about 65 weight percent perfluoroisobutyl methyl ether, and (b) organic solvent, which composition is selected from the group consisting of:

(i) compositions consisting essentially of the ether and trans-1,2-dichloroethylene, the compositions, when fractionally distilled, form a distillate fraction that is an azeotrope that consists essentially of about 50 weight percent of the ether and 50 percent of the trans-1,2-dichloroethylene and boils at about 41° C. at about 740 torr;

(ii) compositions consisting essentially of the ether and cis-1,2-dichloroethylene, the compositions, when fractionally distilled, form a distillate fraction that is an azeotrope that consists essentially of about 66 weight percent of the ether and 34 percent of the cis-1,2-dichloroethylene and boils at about 55° C. at about 741 torr; (iii) compositions consisting essentially of the ether and 1-chlorobutane, the compositions, when fractionally distilled, form a distillate fraction that is an azeotrope that consists essentially of about 88 weight percent of the ether and 12 percent of the 1-chlorobutane and boils at about 57° C. at about 732 torr;

(iv) compositions consisting essentially of the ether and 2-chlorobutane, the compositions, when fractionally distilled, form a distillate fraction that is an azeotrope that consists essentially of about 79 weight percent of the ether and 21 percent of the 2-chlorobutane and boils at about 55° C. at about 740 torr;

(v) compositions consisting essentially of the ether and i-butyl chloride, the compositions, when fractionally distilled, form a distillate fraction that is an azeotrope that consists essentially of about 80 weight percent of the ether and 20 percent of the i-butyl chloride and boils at about 55° C. at about 741 torr;

(vi) compositions consisting essentially of the ether and t-butyl chloride, the compositions, when fractionally distilled, form a distillate fraction that is an azeotrope that consists essentially of about 47 weight percent of the ether and 53 percent of the t-butyl chloride and boils at about 48° C. at about 743 torr;

(vii) compositions consisting essentially of the ether and 1,2-dichloropropane, the compositions, when fractionally distilled, form a distillate fraction that is an azeotrope that consists essentially of about 94 weight percent of the ether and 6 percent of the 1,2-dichloropropane and boils at about 59° C. at about 745 torr; (viii) compositions consisting essentially of the ether and 2,2-dichloropropane, the compositions, when fractionally distilled, form a distillate fraction that is an azeotrope that consists essentially of about 81 weight percent of the ether and 19 percent of the 2,2-dichloropropane and boils at about 55° C. at about 727 torr;

(ix) compositions consisting essentially of the ether and methylene chloride, the compositions, when fractionally distilled, form a distillate fraction that is an azeotrope that consists essentially of about 45 weight percent of the ether and 55 percent of the methylene chloride and boils at about 35° C. at about 743 torr;

(x) compositions consisting essentially of the ether and 1-bromopropane, the compositions, when fractionally distilled, form a distillate fraction that is an azeotrope that consists essentially of about 74 weight percent of the ether and about 26 percent of the 1-bromopropane and boils at about 53° C. at about 731 torr;

(xi) compositions consisting essentially of the ether and HCFC-225 ca/cb, the compositions, when fractionally distilled, form a distillate fraction that is an azeotrope that consists essentially of about 31 weight percent of the ether and about 69 percent of the HCFC-225 ca/cb and boils at about 53° C. at about 740 torr; and (xii) compositions consisting essentially of the ether and 1,1,2-trichloroethylene, the compositions, when fractionally distilled, form a distillate fraction that is an azeotrope that consists essentially of about 87 weight percent of the ether and about 13 weight percent of the 1,1,2-trichloroethylene and boils at about 58° C. at about 744 torr;

wherein the concentrations of the ether and the organic solvent in the azeotrope-like composition differ from the concentrations of such components in the corresponding azeotrope by no more than ten percent.

6. An azeotrope-like composition according to claim 5 wherein the concentrations of the ether and the organic solvent in the azeotrope-like composition differ from the concentrations of such components in the corresponding azeotrope by no more than five percent.

7. An azeotrope-like composition according to claim 5 wherein the azeotrope-like composition is an azeotrope.

8. An azeotrope-like composition including (a) perfluorobutyl methyl ether consisting essentially of perfluoro-n-butyl ether and perfluoroisobutyl methyl ether, and (b) organic solvent, which composition is selected from the group consisting of:

(i) compositions consisting essentially of about 75 to 17 weight percent of the ether and about 25 to 83 weight percent trans-1,2-dichloroethylene that boil at about 39 to 41° C. at about 729 torr; or (ii) compositions consisting essentially of about 72 to 29 weight percent of the ether and about 28 to 71 weight percent cis-1,2-dichloroethylene that boil at about 51 to 53° C. at about 741 torr.

9. An azeotrope-like composition including (a) perfluorobutyl methyl ether consisting essentially of about 95 weight percent perfluoro-n-butyl methyl ether and about 5 weight percent perfluoroisobutyl methyl ether, and (b) organic solvent, wherein the composition consists essentially of the ether and trans-1,2-dichloroethylene, and the composition, when fractionally distilled, forms a distillate fraction that is an azeotrope consisting essentially of about 44 weight percent of the ether and 56 percent of the trans-1,2-dichloroethylene and boiling at about 41° C. and about 730 torr wherein the concentrations of the ether and the organic solvent in the azeotrope-like composition differ from the concentrations of such components in the corresponding azeotrope by no more than about ten percent.

10. An azeotrope-like composition according to claim 9 wherein the concentrations of the ether and the organic solvent in the azeotrope-like composition differ from the concentrations of such components in the corresponding azeotrope by no more than about five percent.

11. An azeotrope-like composition according to claim 10 wherein the azeotrope-like composition is an azeotrope.

12. An azeotrope-like composition including (a) perfluorobutyl methyl ether consisting essentially of about 35 weight percent perfuoro-n-butyl methyl ether and about 65 weight percent perfluoroisobutyl methyl ether, and (b) organic solvent, wherein the composition consists essentially of the ether and trans-1,2-dichloroethylene, and the composition, when fractionally distilled, forms a distillate fraction that is an azeotrope consisting essentially of about 50 weight percent of the ether and 50 percent of the trans-1,2-dichloroethylene, boiling at about 41° C. and about 740 torr, wherein the concentrations of the ether and the organic solvent in the azeotrope-like composition differ from the concentrations of such components in the corresponding azeotrope by no more than about ten percent.

13. An azeotrope-like composition according to claim 12 wherein the concentrations of the ether and the organic solvent in the azeotrope-like composition differ from the concentrations of such components in the corresponding azeotrope by no more than about five percent.

14. An azeotrope-like composition according to claim 12 wherein the azeotrope-like composition is an azeotrope.

15. An azeotrope-like composition including (a) perfluorobutyl methyl ether consisting essentially of perfuoro-n-butyl ether and perfluoroisobutyl methyl ether, and (b) organic solvent, which composition consists essentially of about 82 to 8 wt percent of the ether and about 18 to 92 weight percent methylene chloride and boils at about 33 to 35° C. at about 737 torr.

16. An azeotrope-like composition including (a) perfluorobutyl methyl ether consisting essentially of about 35 weight percent perfluoro-n-butyl methyl ether and about 65 weight percent perfluoroisobutyl methyl her, and (1) organic solvent wherein the composition consists essentially of the ether and methylene chloride, and the composition, when fractionally distilled, forms a distillate fraction that is an azeotrope consisting essentially of about 45 weight percent of the ether and 55 percent of the methylene chloride, boiling at about 35° C. and about 743 torr, wherein the concentrations of the ether and the organic solvent in the azeotrope-like composition differ from the concentrations of such components in the corresponding azeotrope by no more than about ten percent.

17. An azeotrope-like composition according to claim 16 wherein the concentrations of the ether and the organic solvent in the azeotrope-like composition differ from the concentrations of such components in the corresponding azeotrope by no more than about five percent.

18. An azeotrope-like composition according to claim 16 wherein the azeotrope-like composition is an azeotrope.

19. An azeotrope-like composition including (a) perfluorobutyl methyl ether consisting essentially of about 35 weight percent-perfluoro-n-butyl methyl ether and about 65 weight percent perfluoroisobutyl methyl ether, and (b) organic solvent, wherein the composition consists essentially of the ether and cis-1,2-dichloroethylene, and the composition, when fractionally distilled, forms a distillate fraction that is an azeotrope consisting essentially of about 66 weight percent of the ether and 34 percent of the cis-1,2-dichloroethylene, boiling at about 55° C. and about 741 torr, wherein the concentrations of the ether and the organic solvent in the azeotrope-like composition differ from the concentrations of such components in the corresponding azeotrope by no more than about ten percent.

20. An azeotrope-like composition according to claim 19 wherein the concentrations of the ether and the organic solvent in the azeotrope-like composition differ from the concentrations of such components in the corresponding azeotrope by no more than about five percent.

21. An azeotrope-like composition according to claim 19 wherein the azeotrope-like composition is an azeotrope.

\* \* \* \* \*